United States Patent [19]

Archibald et al.

[11] Patent Number: 4,519,669

[45] Date of Patent: May 28, 1985

[54] BRAID CLAMP FOR GENERATOR SHAFT VOLTAGE AND CURRENT PICKUP

[75] Inventors: James B. Archibald, Schenectady; James V. Eats, Albany, both of N.Y.

[73] Assignee: General Electric Company, Schenectady, N.Y.

[21] Appl. No.: 595,064

[22] Filed: Mar. 30, 1984

[51] Int. Cl.³ .............................................. H01R 4/50
[52] U.S. Cl. ..................................... 339/274; 339/5 S
[58] Field of Search .................. 339/295 R, 274, 5 R, 339/5 S, 5 P, 8 R, 75 R

[56] References Cited

U.S. PATENT DOCUMENTS

| 2,242,273 | 5/1941 | Taylerson | 339/8 R X |
| 3,013,143 | 12/1961 | Hayden | 339/5 S X |
| 4,378,138 | 3/1983 | Sohre | 339/8 R X |

*Primary Examiner*—Eugene F. Desmond
*Attorney, Agent, or Firm*—John F. Ahern; Paul Checkovich

[57] ABSTRACT

A braid clamp for generator shaft voltage and current pickup employs a compound lever for forcibly locking clamping faces of a compound action clamping block into firm contact with a portion of a metallic braid. The metallic braid is thereby secured with a portion thereof in trailing contact with a surface of the generator shaft. Provision is made for holding a substantial free end of the metallic braid ready for use but secure from accidental contact with adjacent objects. The free end may be employed for contact with the shaft by reversing the braid or may serve as a supply of braid which may be fed between the clamping faces. The compound lever is quickly openable and closeable to reduce any risk to workers servicing the metallic braid in close proximity to the rapidly rotating generator shaft.

9 Claims, 5 Drawing Figures

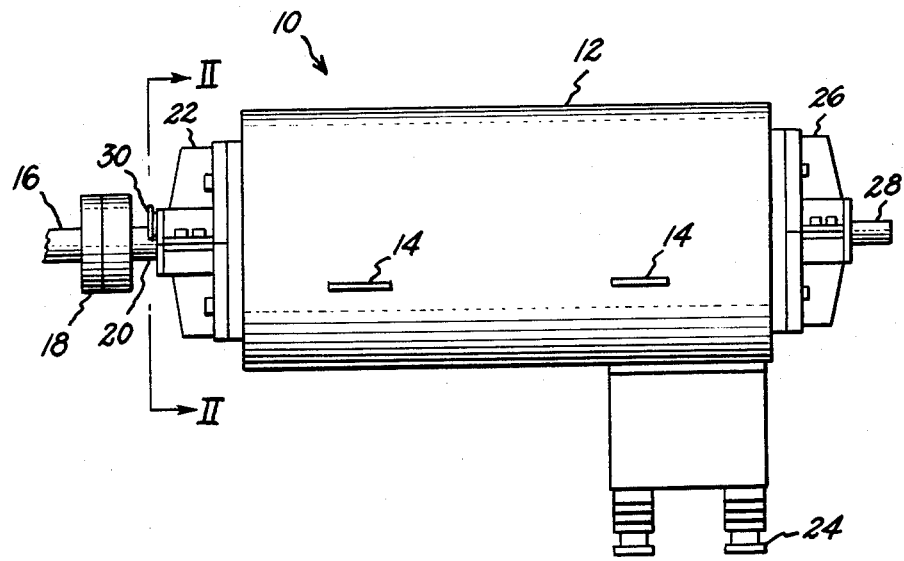
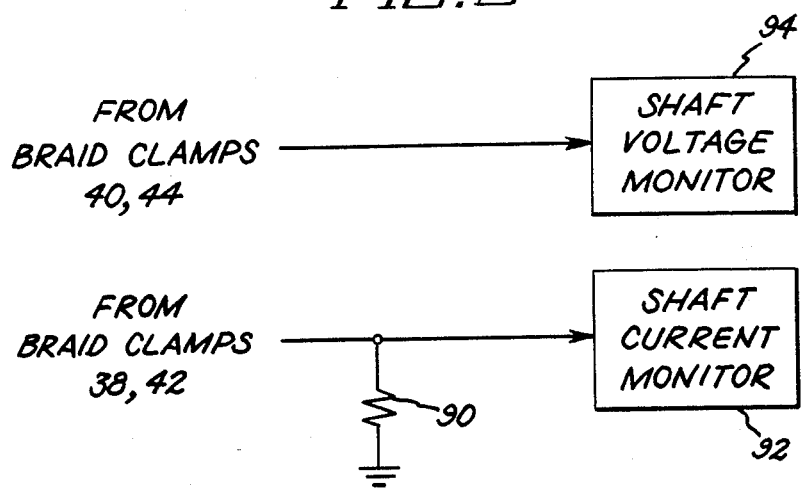

BRAID CLAMP FOR GENERATOR SHAFT VOLTAGE AND CURRENT PICKUP

BACKGROUND OF THE INVENTION

The present invention relates to apparatus for monitoring shaft voltage and current in large dynamoelectric machines and, more particularly, to quick-release and quick-clamping apparatus for affixing pickup braid of a shaft voltage and current monitoring system in position contacting the shaft of a large dynamoelectric machine.

The shaft of a large dynamoelectric machine such as, for example, a large generator of a steam turbine-generator system is electrically insulated from the generator frame by, among other things, a lubricant film in conventional journal bearings. Several sources may produce a voltage on the shaft which, if allowed to rise to a sufficiently high value, may produce arcing through the lubricant film resulting in pitting of the bearing surfaces and a resultant acceleration in bearing wear.

A static voltage may be generated in the shaft by condensed water droplets being thrown off the buckets of the last stage in the steam turbine and carrying electric charges with them. Although this source does not provide for a large current, if satisfactory means is not provided for bleeding off the static voltage it may rise to a high enough value to arc through the bearing lubricant film.

An AC ripple on the DC field winding of the generator rotor may be capacitively coupled to the rotor forging and thence to the shaft to produce an AC voltage thereon. This is also a weak source of voltage which will decay rapidly and/or remain at a low level if current is allowed to flow through an appropriate grounding apparatus.

It is conventional to provide a grounding apparatus on the turbine end of the generator shaft to dissipate voltage from the above two voltage sources. In order to verify the operation of the grounding equipment, it is useful to monitor the voltage on the generator shaft. Since the voltage from the above two sources is easily discharged, monitoring the shaft voltage requires high-impedance voltage monitoring equipment to prevent the voltage from decaying through the input impedance of the voltage monitoring equipment.

A substantial voltage may be generated between the ends of the generator shaft due to dissymmetries in the generator magnetic circuits. In contrast to the above-described sources, the voltage difference between the ends of the generator shaft, if it finds a suitable path, is capable of supplying a very substantial current. The collector end of a generator shaft is usually well insulated from the generator frame and thus limits the current normally expected to flow through the bearings and generator frame to a very low value. If the insulation at the collector end of the generator shaft breaks down, or becomes ineffective, relatively large currents, in the range of several amperes, can flow through the grounding apparatus at the turbine end of the generator shaft with very rapid deterioration of the affected bearings. It is therefore desirable to monitor the current flowing in the grounding apparatus to detect the large currents which may occur with this type of fault.

Conventional grounding apparatus employs a plurality of sliding contact devices contacting the turbine end of the shaft both for grounding and for monitoring of voltage and current. Such sliding contact devices include, for example, carbon brushes, copper braid and silver-plated copper braid. Due to its low cost and the low-resistance contact that copper braid makes with a steel shaft, such copper braid is favored as sliding contact devices in a number of applications. Typically, such copper braid is clamped in bolted clamping devices with a substantial length of the copper braid in trailing contact with the surface of the shaft.

After a period of use, the contact resistance of such copper braid increases due to pickup of dirt, oil and grease and the oxidation of the surface of the copper. The desired low contact resistance may be restored by removing and cleaning or replacing the copper braid.

A large steam turbine-generator system remains on line at full operating speed for long periods of time and the process and risk of stopping one for any reason are far from trivial. The copper braid and the clamping device holding it in position are necessarily in close proximity to the rapidly rotating generator shaft and must usually be removed and replaced while the generator continues in operation. The requirement for removing a plurality of bolts to remove a braid and for installing and tightening such bolts for replacing the braid, all performed in close proximity to a rapidly rotating (e.g. 3600 RPM) shaft and a bolted coupling is, at the least, a cause for extra care and possible concern on the part of a worker having the responsibility to do this job.

OBJECTS AND SUMMARY OF THE INVENTION

Accordingly, it is an object of the invention to provide an attachment means for a metallic braid which overcomes the drawbacks of the prior art.

It is a further object of the invention to provide a quick-release, quick-attach clamp for affixing a metallic braid of a shaft voltage and current monitoring system.

Briefly stated, the present invention provides a braid clamp for generator shaft voltage and current pickup employing a compound lever for forcibly locking clamping faces of a compound action clamping block into firm contact with a portion of a metallic braid. The metallic braid is thereby secured with a portion thereof in trailing contact with a surface of the generator shaft. Provision is made for holding a substantial free end of the metallic braid ready for use but secure from accidental contact with adjacent objects and out of the way of operation of the compound lever. The free end may be employed for contact with the shaft by reversing the braid or may serve as a supply of braid which may be fed between the clamping faces alternatively if the entire metallic braid is contaminated, the entire metallic braid may be removed and a new piece of metallic braid may be inserted. The compound lever is quickly openable and closeable to reduce any risk to workers servicing the metallic braid in close proximity to the rapidly rotating generator shaft.

BRIEF DESCRIPTION OF THE DRAWINGS

FIG. 1 is a side view of a generator showing the location of the grounding system of the present invention.

FIG. 5 is a simplified block diagram of current and voltage measurement instruments for use with the shaft pickup assembly of the present invention.

DETAILED DESCRIPTION OF THE PREFERRED EMBODIMENT

Figure 2:
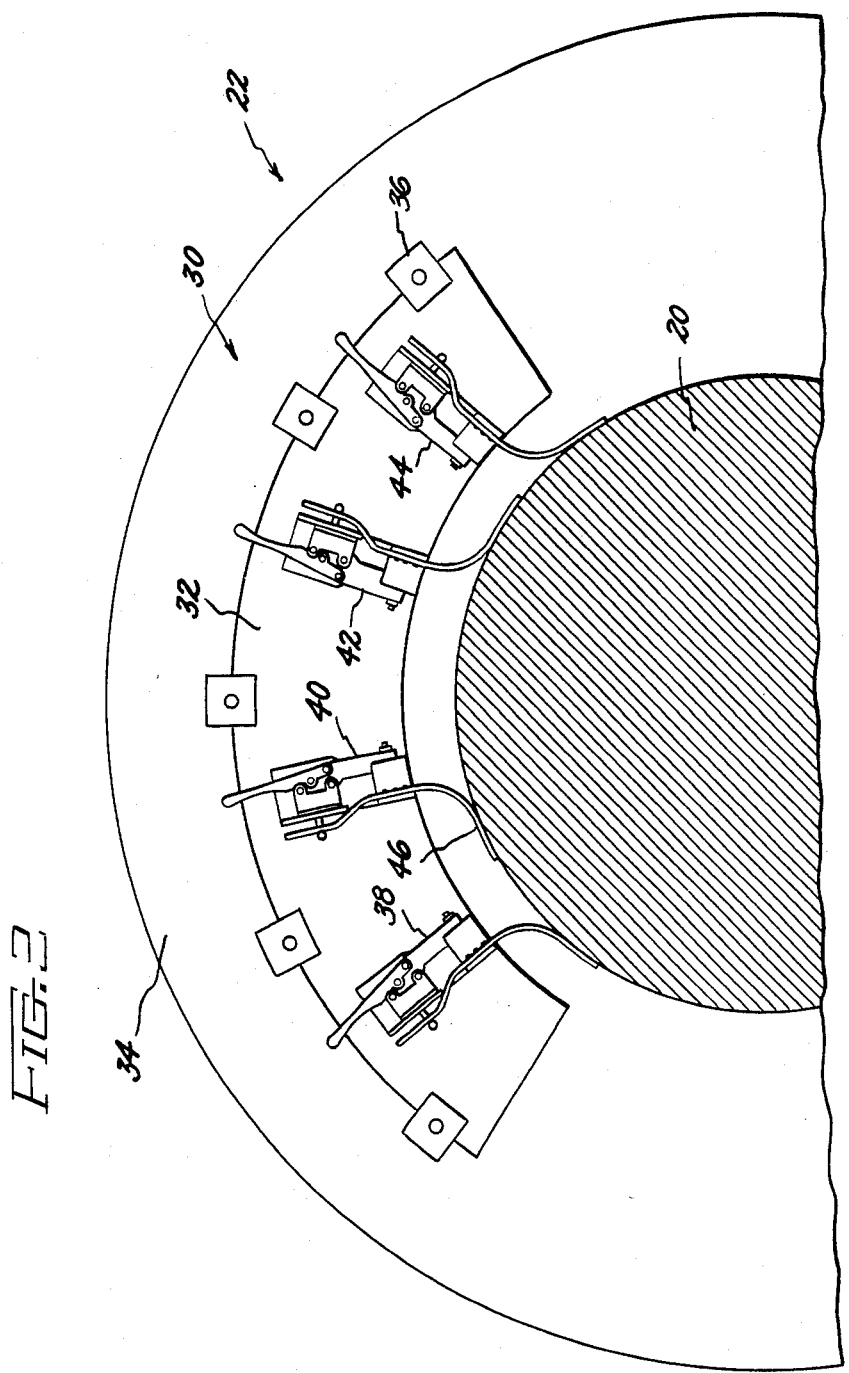
FIG. 2 is a closeup view of a shaft pickup assembly according to an embodiment of the invention taken along II—II in FIG. 1.

Referring to FIG. 1, there is shown, generally at 10, a large dynamoelectric generator on which an embodiment of the present invention may be used. A housing 12 which, in the particular instance shown, may be cylindrical, encloses the stationary and rotating parts (not shown) of generator 10. Mounting plates 14 are conventionally provided for mounting generator 10 on a foundation (not shown). A prime mover such as, for example, a steam turbine, drives an input shaft 16 which is coupled through a bolted coupling 18 to a generator shaft 20. Generator shaft 20 passes through an end shield 22 into generator 10. The end of generator 10 nearer input shaft 16 is conventionally called the turbine end and such practice will be followed here. End shield 22 may contain conventional components such as bearings and oil deflectors (not shown) for rotatably supporting generator shaft 20 and for lubrication.

An end shield 26 is provided at the opposite end of generator 10 for sealing housing 12 and for containing conventional bearings and oil deflectors (not shown). The end of generator 10 covered by end shield 26 which conventionally contains collector bars (not shown) for connecting the generated power to power terminal 24, is conventionally called the collector end of generator 10. An auxiliary shaft 28, integrally rotated with generator shaft 20, may pass through end shield 26 for, for example, DC field excitation pickup, or other purposes not of concern to the present disclosure.

A shaft pickup assembly 30 is disposed on end shield 22 adjacent generator shaft 20. A more detailed view of shaft pickup assembly 30 is shown in FIG. 2 to which reference is now made. An insulating sector 32 of shaft pickup assembly 30 is supported spaced outward from an oil deflector 34 on a plurality of standoffs 36. Four quick-attach, quick-release braid clamps 38, 40, 42 and 44 are mounted on insulating sector 32. Each of braid clamps 38, 40, 42 and 44 holds a length of metallic braid 46 in trailing contact with the rotating peripheral surface of generator shaft 20.

It will be noted in FIG. 2 that metallic braid 46 enters from the left in braid clamps 38 and 40 and from the right in braid clamps 42 and 44. Except for this difference in handedness, braid clamps 38, 40, 42 and 44 are identical. Thus, only braid clamp 40 is described in detail.

Figure 3:
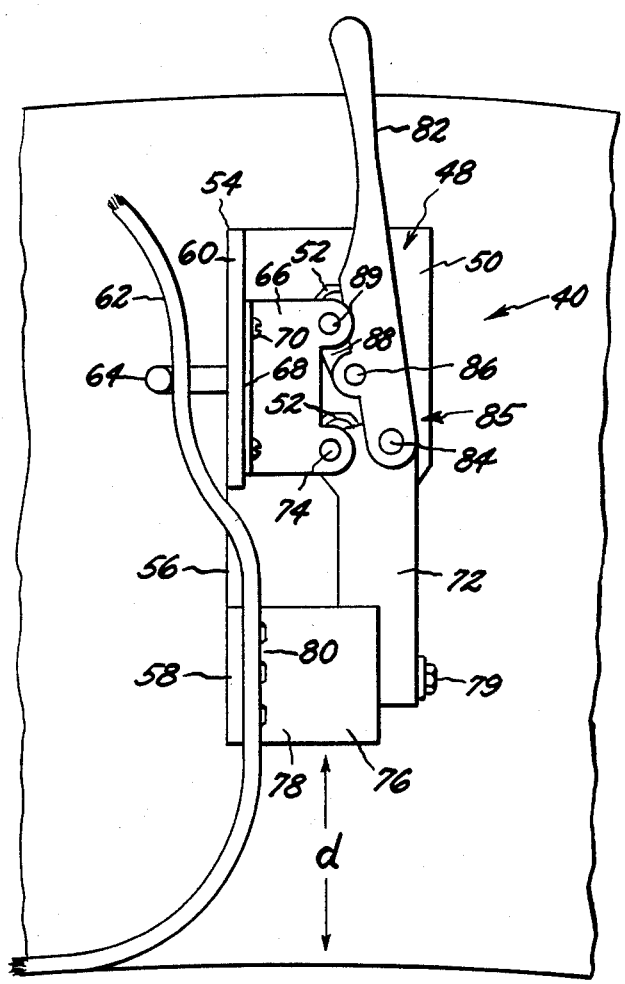
FIG. 3 is a closeup view of a closed braid clamp of FIG. 2 according to an embodiment of the invention.

Referring now to FIG. 3, braid clamp 40 includes a metallic angle bracket 48. One leaf 50 of angle 48 is affixed to insulating sector 32 by any convenient means such as, for example, by bolts 52. The other leaf 54 of angle bracket 48 extends outward at 90 degrees from insulating sector 32. A slot 56 divides leaf 54 into a clamp jaw portion 58 and a clamp support portion 60. A free end 62 of metallic braid 46 passes through slot 56 and is dressed near clamp support portion 60 by a retainer 64 which may be of any convenient form such as the bent rod shown in the figure. The use of retainer 64 permits initially installing a length of metallic braid 46 in braid clamp 40 which is substantially longer than is immediately needed without the extra length of metallic braid 46 getting in the way, or bending, to provide an accidental short circuit to an adjacent part such as, for example, an adjacent braid clamp. The availability of a clean unused free end 62 permits, for example, reversing metallic braid 46 when contact resistance exceeds tolerances. Alternatively, the trailing portion in contact with the surface of generator shaft 20 may be trimmed and a fresh portion of metallic braid 46 may be fed through slot 56 into trailing contact with generator shaft 20. As a further alternative, a new metallic braid 46 may be inserted and the old metallic braid 46 may be discarded.

A compound action clamp, shown generally at 65, includes a clamp base 66 having a base flange 68, by means of which it may be affixed to clamp support portion 60 using, for example, bolts 70. A clamp arm 72 is pivoted to clamp base 66 at a pivot 74. A clamping block 76 is affixed to clamp arm 72 by any convenient means such as, for example, bolt 79. A clamping face 78 on clamping block 76 is urged into opposing abutment with a clamping face 59 of clamp jaw portion 58 including a portion of metallic braid 46 between clamping faces 59 and 78. In order to more firmly grip metallic braid 46 and to improve electrical contact, clamping face 78 may have a pattern of teeth 80 formed therein. An end of a handle 82 is pivoted to clamp arm 72 at a pivot 84 displaced from pivot 74. An intermediate point on handle 82 is pivoted on a pivot 86 to one end of a compounding lever 88. The other end of compounding lever 88 is pivoted to clamp base 66 at pivot point 89. The lever geometry of compound action clamp 65 locks clamping block 76 into forceful contact with metallic braid 46 when handle 82 is rotated into the locking position shown.

The length of the portion of metallic braid 46 in trailing contact with the surface of generator shaft 20, the distance of clamp jaw portion 58 and clamping block 76 from generator shaft 20, as well as the angle that the clamping surfaces make with the tangent to the surface of generator shaft 20 may vary in different applications and for metallic braids 46 of different widths, thicknesses and stiffnesses. For concreteness, however, a length of metallic braid 46 of about 5 inches or more may extend inwardly past clamp jaw portion 58 and clamping block 76. This length is, of course, bent into contact with generator shaft 20. A distance d between clamping block 76 (or clamp jaw portion 58) may be, for example, about 1 inch. Clamping face 78 of clamping block 76 is shown disposed approximately normal to the surface of generator shaft 20. It is fully within the contemplation of the present invention that other angular relationships and distances 'd' may be chosen for clamping block 76 without departing from the scope of the invention.

Figure 4:
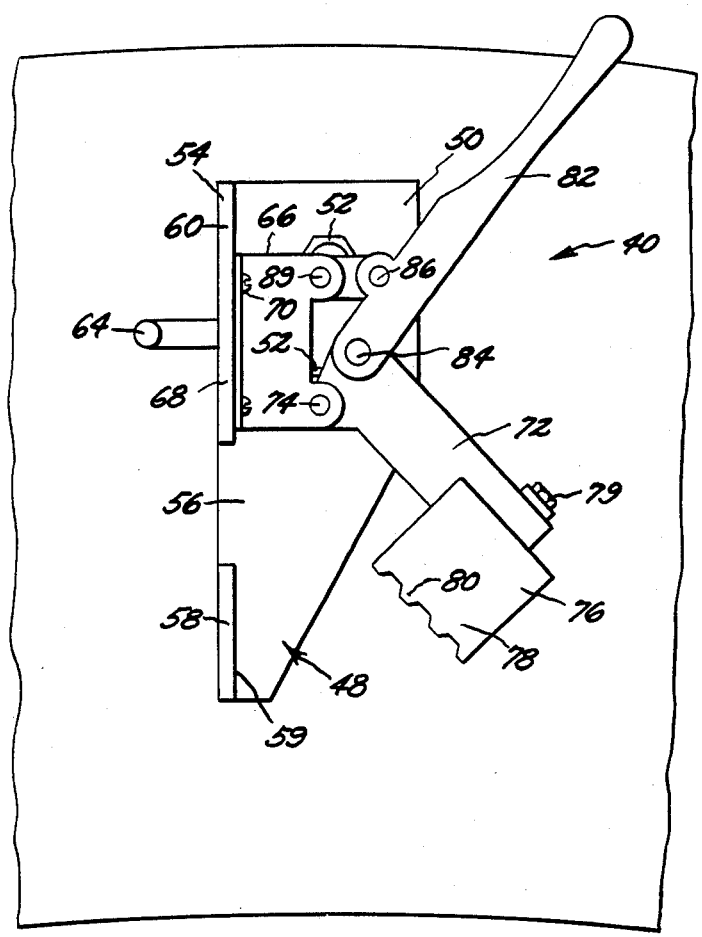
FIG. 4 is a closeup view of the braid clamp of FIG. 1 in the open position.

When handle 82 is moved into the unlocking position shown in FIG. 4, braid clamp 40 is unlocked and clamping block 76 is rotated out of contact with metallic braid 46 so that metallic braid 46 may be easily, quickly and safely removed for refurbishing or replacement.

The provision of slot 56 in leaf 54 and retainer 64 for dressing free end 62 alongside clamp support portion 60 places free end 62 on the opposite side of clamp support portion 60 from handle 82 and prevents it from getting in the way of rapid and precise operation of compound action clamp 65.

Angle bracket 48 and compound action clamp 65 may be of any convenient material suitable for the environment and for making satisfactory electrical contact with metallic braid 46. In the preferred embodiment, angle bracket 48, clamping block 76 and the remainder of compound action clamp 65 are of carbon steel. Some, or all, of the elements of braid clamp 40 may be electroplated or otherwise treated to improve the electrical conductivity thereof. The voltage and/or current picked up by braid clamp 40 may be cabled to its destination by direct electrical connection to clamping block 76 but, in the preferred embodiment, it is satisfactory to clamp a cable (not shown) under one or both of bolts 52 for electrical connection to leaf 50.

Although voltage and current measurement apparatus are not part of the present invention, the following brief description of the manner in which such measurement apparatus is used with the clamping devices of the present invention is included for completeness of disclosure.

Referring now to FIGS. 2 and 5, the four braid clamps 38, 40, 42 and 44 are conventionally connected by conventional cabling in non-adjacent parallel pairs with one pair, for example, braid clamp 38 and braid clamp 42, being used to apply current picked up from generator shaft 20 to a current shunt resistor 90 having a small value of resistance of, for example, about 0.01 ohm. A voltage developed across current shunt resistor 90, which is proportional to the shaft current picked up by braid clamp 38 and braid clamp 42, is fed to a shaft current monitor 92. Similarly, a shaft voltage picked up by braid clamp 40 and braid clamp 44 is fed to a shaft voltage monitor 94. Shaft current monitor 92 and shaft voltage monitor 94 may be employed to drive indicators, recording devices or alarms (not shown) which may form part of the operating system of generator 10.

The use of a pair of parallel-connected braid clamps for current and voltage pickup, besides giving redundancy in case of failure of one pickup, also cuts the contact resistance in half. In the case of the braid clamps used for current pickup in particular, it is useful to have a second current pickup in place while changing the braid of the other current pickup in order to keep the shaft voltages discharged to low levels. If both current pickups are removed at the same time, the static buildup may progress to the point where a person inadvertently coming into contact with the shaft may experience an undesirable startle reaction. By adopting an operating procedure wherein at least one of the current pickups always remains installed, safe operation and maintenance of the apparatus is assured.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for clamping a strip of conductive material in trailing contact with a surface of a shaft, comprising:

a stationary member;
insulated means for affixing said stationary member a predetermined distance from said surface;
a first clamp portion on said stationary member;
said first clamp portion having a first clamping face;
a second clamp portion having a second clamping face;
a clamp base on said stationary member;
means for hinging said second clamp portion to said clamp base;
a handle having first and second positions;
a compound lever connected to said handle and said second clamp portion;
said compound lever including means responsive to said lever being placed in said first position for forcibly urging said second clamping face into locking contact with a portion of said strip of conductive material on said first clamping face whereby said strip of conductive material is firmly clamped between said first and second clamping faces; and
said compound lever further including means responsive to said lever being placed in said second position for hinging said second clamping face away from said strip of conductive material on said first clamping face whereby said strip of conductive material is released.

2. Apparatus for clamping a strip of conductive material according to claim 1 wherein said stationary member includes at least one leaf having first and second sides, said at least one leaf including at least one slot therein, said at least one slot being effective for dividing said at least one leaf into first and second parts, said first side of said first part being said first clamping face, said slot being effective for permitting a free end of said strip of conductive material to pass therethrough to said second side of said leaf.

3. Apparatus for clamping a strip of conductive material according to claim 2 further comprising a retainer on said second side, said retainer including means for retaining a portion of said free end near said second side whereby said free end is retained out of contact with adjacent parts.

4. Apparatus for clamping a strip of conductive material according to claim 3 wherein said retainer includes means effective for retaining an amount of said free end which is long enough to substitute for a portion of said strip in trailing contact with said shaft by removal and reversal of said strip of conductive material in said apparatus for clamping.

5. Apparatus for clamping a strip of conductive material according to claim 2 wherein said clamp base is mounted on said second part.

6. Apparatus for clamping a strip of conductive material according to claim 1 wherein said compound lever includes a compounding lever having first and second ends, said first end including a first pivot pivoted to said clamp base, said second end including a second pivot pivoted to said handle, said handle including a third pivot pivoted to said second clamp portion, said second clamp portion including a fourth pivot pivoted to said stationary member, and a geometry of said first, second, third and fourth pivots being effective for producing said locking contact and for said hinging said second clamping face away from said strip of conductive material.

7. Apparatus for clamping a strip of conductive material according to claim 1 wherein at least one of said first and second clamping faces includes teeth therein for contacting said strip of conductive material.

8. A braid clamp for clamping a length of metallic braid in trailing contact with a shaft of a dynamoelectric machine, comprising:

a metallic angle bracket;
insulating means for supporting said metallic angle bracket a predetermined distance from said shaft;
a first leaf of said metallic angle bracket disposed at right angles to an axis of said shaft;

a second leaf of said metallic angle bracket disposed generally parallel to said axis of said shaft;

a slot in said second leaf effective to divide said second leaf into a clamp jaw portion and a clamp support portion;

a first clamping face on said clamp jaw portion;

a clamp base affixed to said clamp support portion;

a compound lever including a handle pivoted to said clamp base;

a clamp arm pivoted to said compound lever and to said clamp base;

a clamping block affixed to said clamp arm;

a second clamping face on said clamp block;

said handle having first and second positions;

said compound lever including means responsive to said handle being in its first position for forcibly locking said second clamping face against a portion of said length of metallic braid on said clamp jaw portion whereby said length of metallic braid is retained in trailing contact with said shaft;

said compound lever further including means responsive to said handle being in its second position for unlocking said clamping face and for rotating said clamping block away from said clamp jaw whereby said length of metallic braid can be removed;

said slot being effective for permitting a free end of said length of metallic braid to pass from a side of said second leaf adjacent said clamping face to an opposed side of said second leaf; and a retainer on said opposed side for retaining said free end out of contact with adjacent parts.

9. A braid clamp according to claim 8 wherein said retainer includes a rod affixed to said angle and bent to retain said free end substantially adjacent said opposed side.

* * * * *